Aug. 25, 1931.     B. S. MINOR     1,820,577
GREASE PACKED GLAND
Filed Oct. 10, 1928

INVENTOR.
BURT S. MINOR.
ATTORNEY.

Patented Aug. 25, 1931

1,820,577

UNITED STATES PATENT OFFICE

BURT S. MINOR, OF SAN PEDRO, CALIFORNIA

GREASE PACKED GLAND

Application filed October 10, 1928. Serial No. 311,520.

This invention relates to packing glands and more particularly to glands adapted to be used between parts rotating relative to one another and carrying mud laden water or other abrasive fluid. The invention has special application to swivels for oil well work where drilling mud is circulated during rotary drilling operations.

The chief object is to provide a "rotating gland" for such uses which will serve satisfactorily to exclude mud or other abrasive liquid from the working surfaces. A further object is to provide a packing gland in which grease may be employed effectively for excluding the liquid and abrasive. And another object is to present such a gland wherein the grease is so introduced that it may serve to expel any liquid which may work through a rotating or other joint as well as any grease which may have become emulsified by reason of contact with entering water.

Heretofore many attempts have been made to produce a packing device which would stand up under use with such structures as mud carrying swivels, but so far as I am aware none has been successful due to the fact that a rotating gland always allows some liquid to leak through the joints during rotation and no construction has ever been devised which would successfully handle such leakage and expel it from the gland.

My invention, however, overcomes these difficulties and serves to limit the leakage of mud or other liquid and abrasive and to expel the same from the working joints, whereby detrimental effects are avoided and the life of the gland parts is prolonged.

Briefly stated, the invention resides in providing in the gland a grease barrier which intercepts whatever liquid and abrasive that leak through, and also in providing for the introduction of additional quantities of grease under pressure in such manner that such leakage and any emulsified grease which may have formed will be forced out through the joint through which the leakage occurred. In a preferred form this is accomplished by introducing the grease at a point above the joint through which leakage occurs so that the mud or other abrasive mixture may not have any opportunity to work through the grease by influence of gravity. Thus, the rotating joint which the mud passes in its travel lies below all other joints or points of entrance into the zone of the grease barrier. In a specific form, the invention is applied to a rotary swivel for introducing mud to wells, comprising a housing in which a swivel stem is rotatably mounted, a mud supplying tube secured to the housing by a mud-tight joint and depending into said stem thereby providing a grease channel between the tube and the stem, packing being provided between the lower end of the tube and the stem, and means for supplying grease (preferably under pressure) to the upper portion of said grease channel.

Preferably additional packing means are provided between the stem and the housing to prevent direct communication between the grease channel and the other working parts including the swivel bearings. The invention resides also in such other novel features as may be herein disclosed.

In the accompanying drawings wherein one embodiment of the invention is disclosed by way of illustration;

Figure 1:
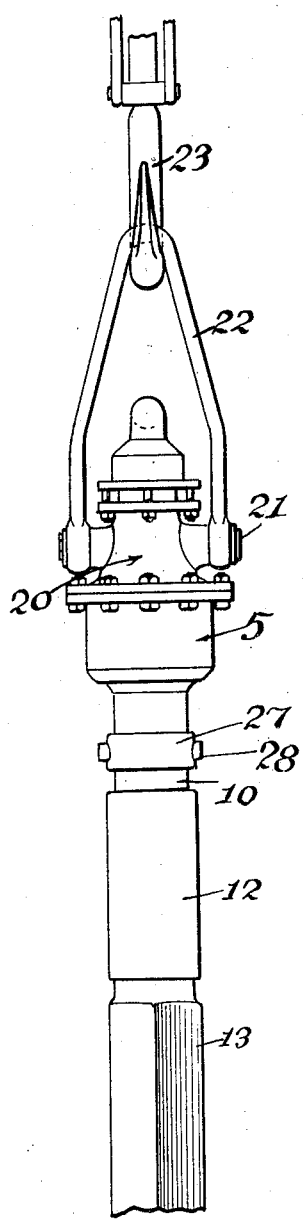
Fig. 1 is an elevation showing a swivel head constructed according to the invention and in operative relation to parts of well drilling equipment.
Figure 2:
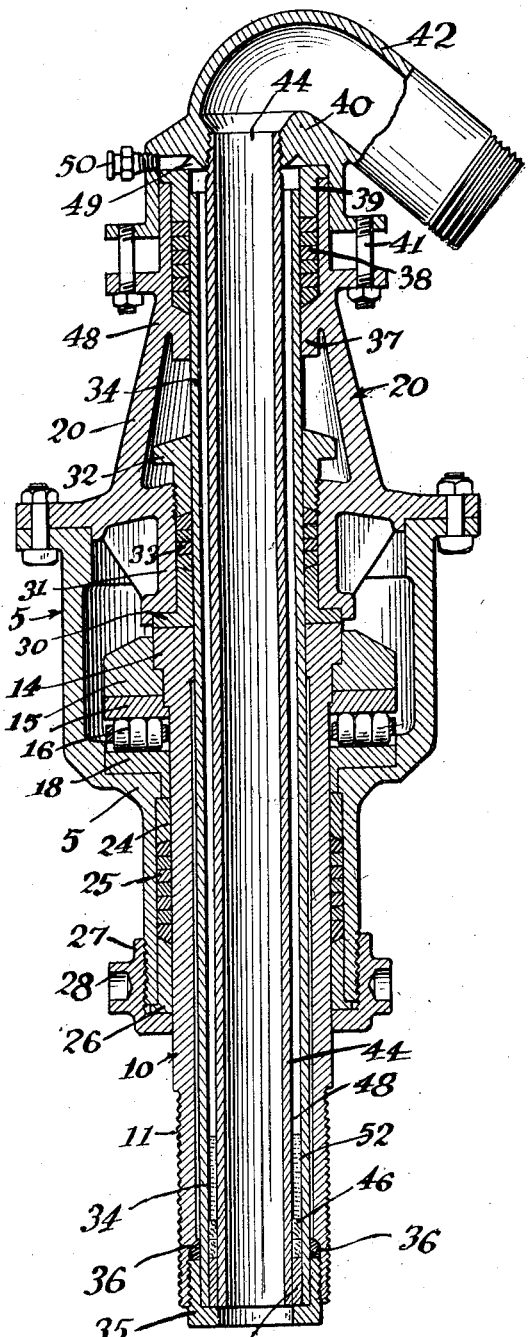
Fig. 2 is a vertical detail section taken through said swivel head.

A swivel housing 5 rotatably receives and carries the upper end of a hollow swivel stem 10 provided with threads 11 at its lower end for the reception of a coupling 12 or the like by means of which said stem 10 is connected with the upper end of a Kelly bar 13 forming the top section of a rotary drill pipe (not shown). The upper end of said stem 10 is provided with a supporting head 14 carried in a bearing block 15 mounted upon a collar 16 traveling over balls or rollers 17 working upon a bearing ring or runway 18 mounted in said swivel housing 5.

Said housing 5 is in turn carried by an upper housing section 20 to which it is conveniently bolted and this section 20 is provided with trunnions 21 which receive the lower ends of a supporting bail 22 adapted to be mounted upon a hook 23 or other handling device.

The lower portion of the housing 5 extends below the bearing ring 18 and forms a box which receives a bushing 24 in which the swivel stem 10 works, said bushing acting also to retain packing 25 compressed by a glandular bushing 26 and held by a cap 27 conveniently provided with wrench sockets 28.

The head 14 of said stem 10 is engaged by a flanged bushing 30 carried in a box 31 and cooperating with a gland 32 to retain packing 33, through which bushing and packing a sleeve 34 projects. This sleeve 34 is secured at its lower end to a shouldered annular fitting 35 threaded into the end of the stem 10, the joint between the sleeve and the fitting being made liquid tight as by means of welding 36. Thus, this sleeve becomes in effect a part of the stem 10. The upper end of said sleeve 34 passes into a box 37 in which packing 38 is compressed by means of a gland and bushing 39 retained in position by means of a head 40 held by bolts 41 and provided with a gooseneck 42 through which mud is adapted to be supplied to a tube 44 threaded or otherwise secured in head 40 to form a liquid tight joint. The lower end of the tube extends to approximately the lower end of the sleeve 34 and stem 10 and is packed off for rotation as by means of a bushing 45 and packing rings or the like 46.

By means of the packing 45, 46 and the positioning of the top of said tube 34, an annular grease channel 48 is formed which communicates at its upper end with a small chamber 49 adapted to be fed with grease through a nipple 50 having a pressure-retaining check valve or the like (not shown).

In operation, the parts are supported from the hook 23 and rotation is imparted to the Kelly bar 13 and the swivel stem 10 by any conventional means as is well understood in the art, the rotation of the head 14 of the stem being permitted by the bearing parts 15, 16, 17, 18 as previously described. As also well understood, circulating mud is required to clear the bit and remove the cuttings, and this mud is pumped through gooseneck 42 into the hole by way of the hollow Kelly bar 13. With the present device, the mud passes from said gooseneck to the Kelly bar through the tube 44, and since the joint between the tube and the gooseneck is liquid-tight, no leakage of mud can take place at this point. However, since the packing 45, 46 at the lower end of the tube must permit rotation between the parts, some leakage necessarily results. This is offset to a large extent by maintaining a body of grease in the channel 48 and chamber 49 under a pressure at least equal to the mud pressure. Even then a quantity of mud works through the packing unless grease be continuously introduced which is not always desirable. But since this leakage is into the lower end of the channel 48 and below the grease it is confined in said lower end as indicated at 52.

In order to remove this leakage and any grease which may have been emulsified by the water under the influence of the rotary motion, additional quantities of grease are injected through the fitting 50 from time to time under pressure sufficient to force the accumulated mud and emulsion out past the packing 45, 46 into the stream of mud passing to the well.

In this manner it is possible to overcome substantially all mud leakage and also to prevent undue wear by those small quantities which are gradually forced and worked through under the high circulating pressure. Since the grease is supplied from above and the leakage is always at the bottom, there is no opportunity for passage of water or abrasive into the body of the grease and only a very small quantity of grease can be emulsified. Therefore no mud can work into the packing boxes 37 and 31 nor into the bearings of the swivel stem itself. The only wear is around the packing 45, 46, and this is small, but even if it were considerable it could be quickly remedied by replacement of the sleeve 34 and tube 44. All wear on the swivel stem and its bearings is definitely prevented.

I claim:

1. A packing device comprising a housing, a hollow stem rotatably carried thereby and extending from one end thereof, a liquid supply connection carried by the other end of the housing, a liquid conducting tube joined to said connection by a liquid-tight joint and extending within said hollow stem to provide a grease channel between the stem and the tube, a packing between the free end of the tube and the stem permitting relative rotation, and means for supplying grease under pressure to the opposite end of said channel.

2. A packing device comprising a housing, a hollow stem rotatably carried by said housing and normally disposed in vertical position, the lower end of said stem projecting from the housing, a liquid receiving tube secured in the upper end of said housing by a liquid tight joint and depending within said hollow stem in position to provide a channel between the tube and the stem, packing means between the tube and the stem at the lower end of the channel, and means for supplying grease to the channel above said packing means.

3. In combination, a swivel housing, a hollow stem rotatably supported in said housing and depending therefrom, a liquid supply tube having a liquid-tight connection with the upper portion of said housing, said tubing depending into said stem and spaced therefrom to form a grease channel between said tube and stem, and packing means between the lower end of the tube and said stem to permit relative rotation therebetween.

4. A structure according to claim 1 wherein means is provided for supplying grease under pressure to the upper portion of the grease channel and for holding the grease therein under pressure.

5. In combination, a swivel housing, a hollow stem having a head rotatably supported in said housing, the lower portion of said stem depending from said housing in a normally vertical position, a liquid connection secured to the top of said housing, a liquid tube secured to said connection by a liquid-tight joint, said tube depending within said hollow stem, packing between the lower portion of said tube and the hollow stem, and means for forcing grease between the tube and stem above the packing.

6. In combination, a swivel housing, a hollow stem having a head rotatably supported in said housing, the stem normally extending from the lower portion of the housing in vertical position, a sleeve secured by a liquid tight joint to said stem and extending thereabove into the upper portion of the housing, a packing about the upper portion of said sleeve, a grease chamber above said packing and communicating with the interior of said sleeve, means to supply grease to said chamber and retain the same under pressure, a liquid connection secured to the top of the housing, a liquid tube secured to said connection by a liquid-tight joint and depending within said sleeve and stem to form a grease channel along the outer wall of the tube, and packing between the lower portion of the tube and the stem.

7. A structure according to claim 1 wherein bearings are provided to support said stem in said housing, and a second packing gland positioned between the first mentioned packing gland and said bearings and including a bushing disposed about said sleeve.

In testimony whereof I affix my signature.

BURT S. MINOR.